April 25, 1944.　　　L. V. LUCIA　　　2,347,603
CUTTING MACHINE
Filed May 30, 1942　　　4 Sheets-Sheet 1

INVENTOR.
Louis V. Lucia

INVENTOR.
Louis V. Lucia

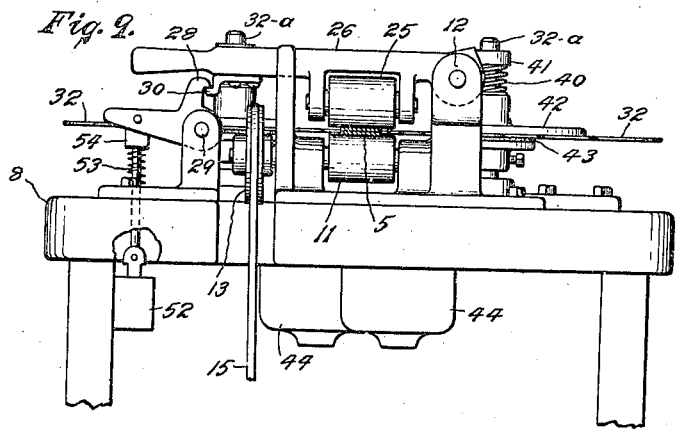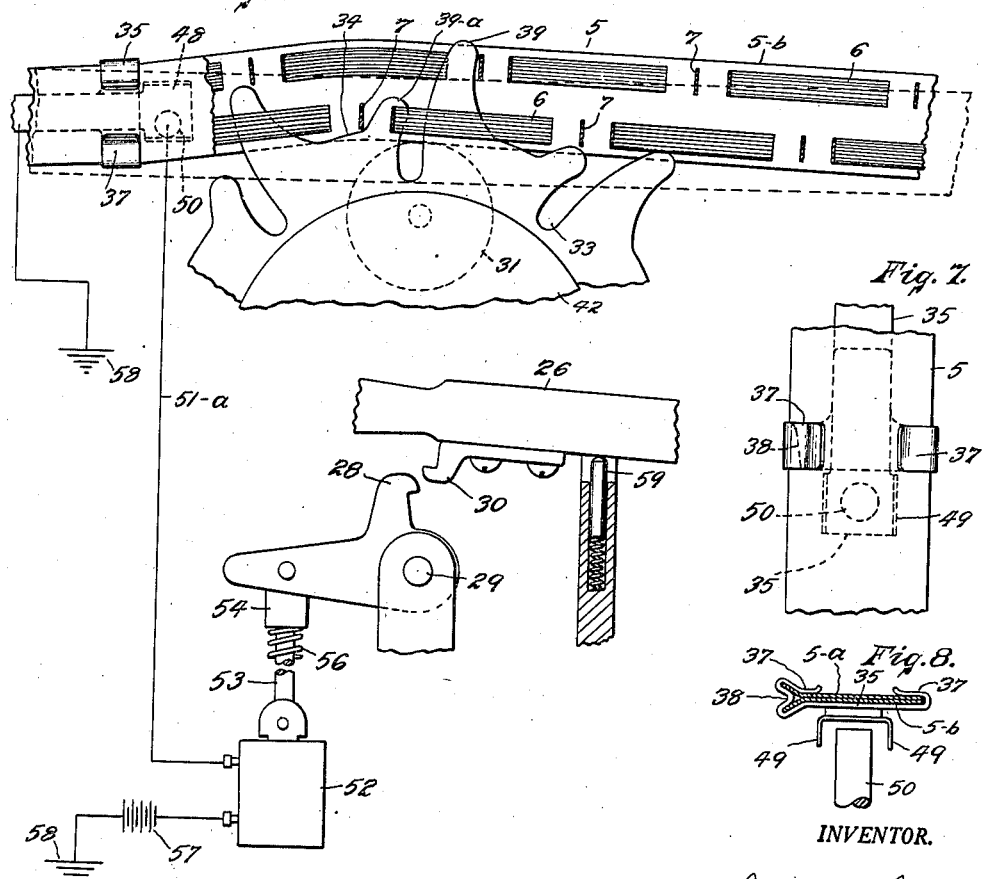

April 25, 1944.  L. V. LUCIA  2,347,603
CUTTING MACHINE
Filed May 30, 1942    4 Sheets-Sheet 4

INVENTOR.
Louis V. Lucia

Patented Apr. 25, 1944

2,347,603

UNITED STATES PATENT OFFICE 2,347,603

CUTTING MACHINE

Louis V. Lucia, West Hartford, Conn.

Application May 30, 1942, Serial No. 445,213

20 Claims. (Cl. 26—7)

This invention relates to cutting machines and more particularly to machines for cutting cross threads in Venetian blind textile tapes, or webbings, having cross threads and cross straps, such as shown and described in Patent No. 2,259,172, dated October 14, 1941.

The primary object of the present invention is to provide a machine in which the cutter is stationary and the tape is moved continuously past said cutter.

A further object of this invention is to provide such a machine in which the cross threads of the tape are permitted to come into contact with and be cut by said cutter and the cross straps are prevented from contacting with the cutter.

A further object is to provide such a machine which is simple in construction, fast in operation and which is easily adjustable for different sizes of webbing.

Further objects of the invention will be more clearly understood from the following description and from the accompanying drawings in which:

Fig. 7 is a fragmentary plan view of a portion of said tape in one of the spreader members.

Fig. 8 is an end view thereof.

Fig. 9 is a rear view of said machine.

Fig. 10 is a view similar to Fig. 3 but illustrating a different position in the operation of the machine and trip release mechanism.

Figure 1:
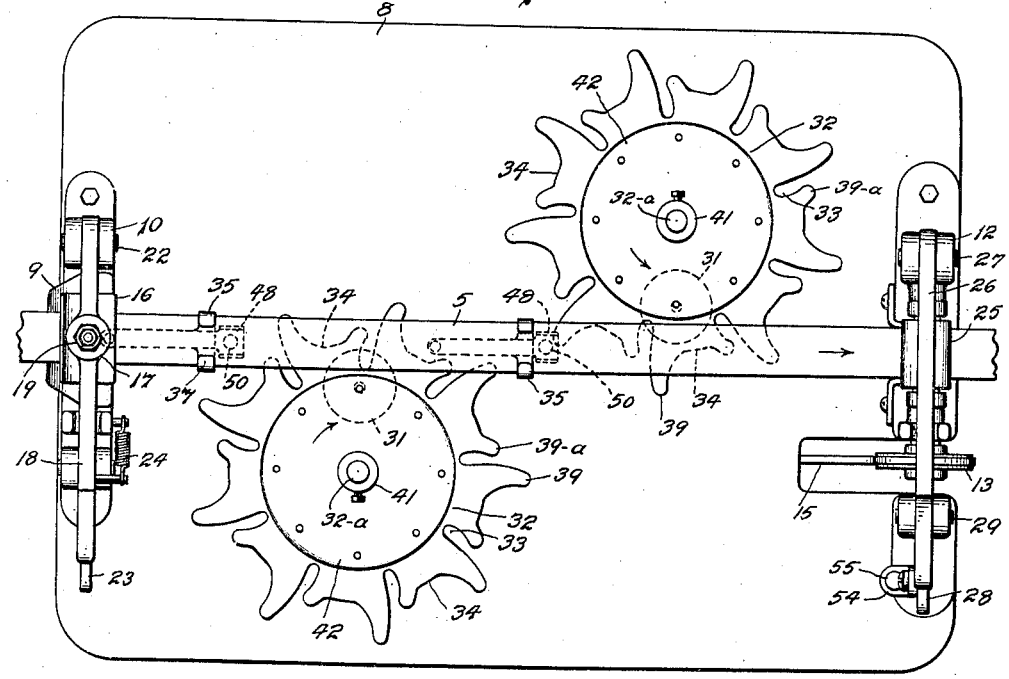
Fig. 1 is a plan view of a machine embodying my invention.
Figure 2:
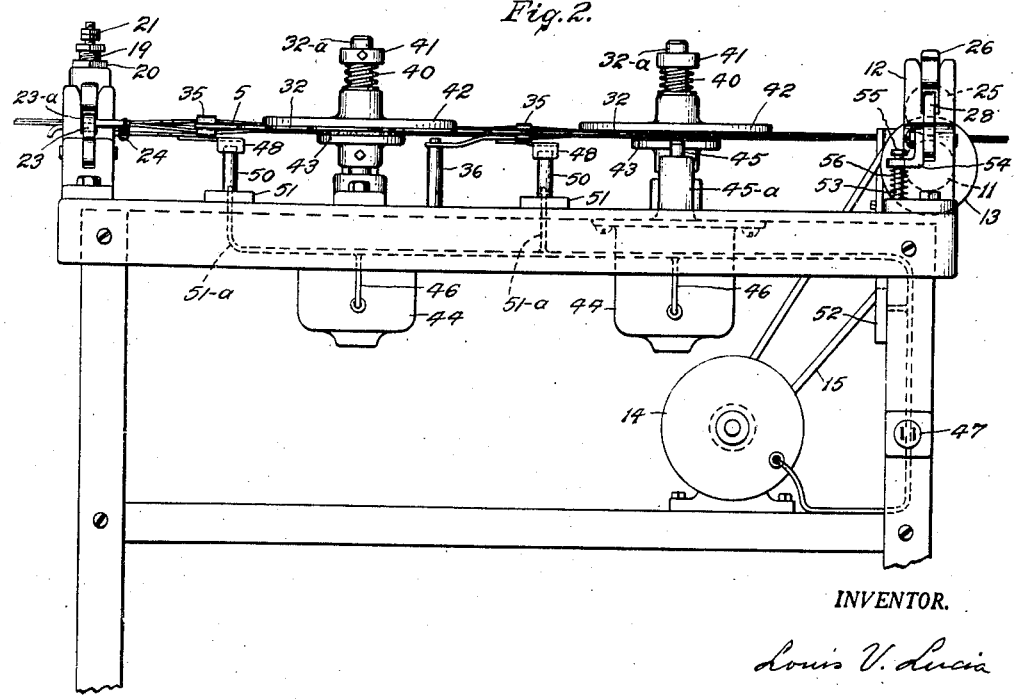
Fig. 2 is a side view thereof in elevation.

As illustrated in the drawings, the numeral 5 denotes a portion of Venetian blind tape which consists of the usual superimposed straps, 5—a and 5—b, of textile material which is woven in one piece to provide cross straps 6 to form the rungs of a ladder for supporting the slats of a Venetian blind.

In the weaving of said tape, it is necessary to produce cross threads, as indicated at 7, for continuing the weaving of the warp threads, which form said cross straps, from one of the strips 5—a and 5—b to the other and it therefore becomes necessary, after the tape is woven, to cut the said cross threads in order to permit separation of the straps 6 so that they may receive the slats of the Venetian blind.

A machine for cutting the said cross threads, which embodies my invention, may comprise a bed 8 on which is mounted a cutting mechanism that includes a tensioning plate 9 mounted in a bracket 10, at the front end, and a feed or pull roll 11 which is rotatably mounted in a bracket 12 at the rear end of said machine and rotated by means of a pulley 13 that is driven by a suitable motor 14 through a belt or chain 15.

An adjustable pressure plate 16 is provided for resiliently forcing the tape upon the tensioning plate 9 in order to provide the desired amount of friction for the proper tensioning of the tape. The said plate 16 is preferably carried on a post 17 that extends through a bar 18 and is forced downwardly by means of a spring, not shown, which is adjusted by a sleeve 19 that is retained in adjusted position by a lock nut 20. The said post 17 may also be adjusted, by means of lock nuts 21, to provide a desired amount of movement in said bar under the action of said spring.

The said bar 18 is pivoted to the bracket 10, as at 22, and retained in a downward position therein, to force the plate 16 upon the tape 5, by means of a hook 23 which is forced into engagement with a detent 23—a on said bar by means of a spring 24.

A preferably resilient pressure roll 25, which may be constructed of rubber or other suitable material, is provided to force the tape into driving engagement with the said feed or pull roll 11. The said pressure roll is mounted in a bar 26 which is hinged, as at 27, and is retained in a downward position by means of a hook 28 that is pivoted at 29 and engages a detent 30 on said bar.

Intermediate the said tensioning and feeding, or pulling, means, I provide a cutter 31, for each side of the tape, which is preferably of the rotary type and mounted on the bed 8 to be positioned between the two straps 5—a and 5—b of the tape and engage the cross threads 7 and sever them as the tape is moved past said cutter.

In order to prevent cutting of the cross straps 6 by said cutter, I provide a strap by-passing disk 32 that is rotatably mounted on a post 32—a, overlies the said cutter and has cross thread receiving notches 33 and cross strap positioning portions 34 thereon which operate as will be hereinafter described.

For each of the said disks 32, there is also provided a tape spreader 35, one of which is pivoted at one end thereof, as upon a post 36, and the other in the bracket 10. Each spreader has tabs 37 which overlie the opposite edge portions of the tape.

The said spreaders are provided with a spreading wedge 38 which extends between the two straps of the tape and separates them near the point where the extensions 39 of the disks 32 enter between the said straps to assure proper entrance of said extensions.

The rotation of said disk 32 on the post 32—a may be controlled by means of a spring 40 which is adjustable, as by a collar 41, for adjustably exerting a required pressure upon the disk-supporting plate 42 and thereby forcing said disk into engagement with a brake disk 43.

Each of the cutters 31 is driven by means of a motor 44 which has a shaft 45 extending upwardly through the bed 8 and rotatably supported in a housing 45—a. The said motors may be connected to an electric circuit by means of suitable conductors, indicated by dotted lines 46, that are connected to an electric receptacle 47.

An automatic trip mechanism is also provided for stopping the movement of the tape through the machine in the event that some defect in the operation thereof should result, either through defect in the weaving of the tape, such as in cases where the warp threads may be miswoven across the straps 5—a and 5—b and interfere with the operation of the disks 31, or where the cutters 31 have become too dull to cut the cross threads.

In such cases, interference with the operation of a disk 31 would cause the tape to be moved outwardly thereon as illustrated in Fig. 10. I therefore provide in said trip mechanism, grounded electrical contact members 48, for each of the disks 31, and preferably mounted on and movable with the spreaders 35.

The said members 48 have depending fingers 49 which extend to opposite sides of electric contact posts 50 that are mounted on insulation blocks 51. Each of these posts is electrically connected, as clearly illustrated in Fig. 10, by suitable conductors 51—a, with a solenoid 52 that is attached to the hook 28 by means of a pull bar 53 which is connected to said hook by a link 54 and has a head 55 that pulls the said hook when the solenoid is energized to operate the trip mechanism as will be hereinafter described. A spring 56 may also be provided for normally retaining the hook 28 into engagement with the detent 30.

The operation of my machine is as follows:

The tape 5 is first placed in the machine by extending a portion of the end thereof over the tensioning plate 9 and the feed roll 11, and over the edges of each of the disks 32 and the cutters 31 so that said disks and cutters will extend into the side of the tape, between the two straps thereof, and the cross threads 7 will register within the notches 33. The tape is next placed in the spreaders 35 so that the adjacent sides of the two straps will be spread apart to facilitate entrance of the extensions 39 on the disks 31 and the pressure plate 16 forced downwardly on the tape and retained thereon, to force said tape into engagement with said tensioning plate, by pressing the bar 18 downwardly until it is engaged and retained by the hook 23. The pressure roll 25 is next forced downwardly on the leading end of the tape by pressing the bar 26 downwardly into engagement with the hook 28 and thereby forcing said tape into driving engagement with the driving or pull roll 11.

The machine is then in the condition illustrated in Fig. 1 and ready to be started in operation, such as by attaching an electric current supply to the connector 47—a, whereupon the motors 44 will drive the cutters 31 and the motor 14 will drive the pull roll 11; thereby pulling said tape through the machine in the direction indicated by the arrow and under tension applied thereto by the plates 9 and 16.

Figure 4:
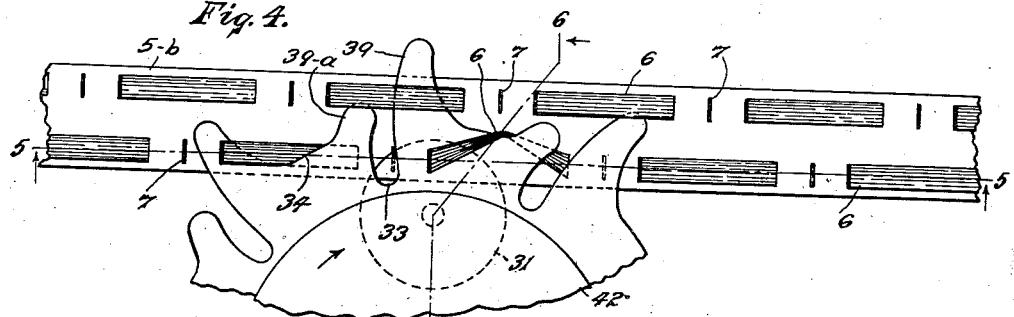
Fig. 4 is a similar view illustrating another position of said mechanism.
Figure 5:
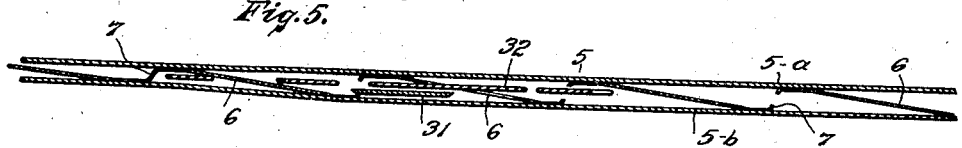
Fig. 5 is a side view of the tape in vertical section on line 5—5 of Fig. 4.
Figure 6:
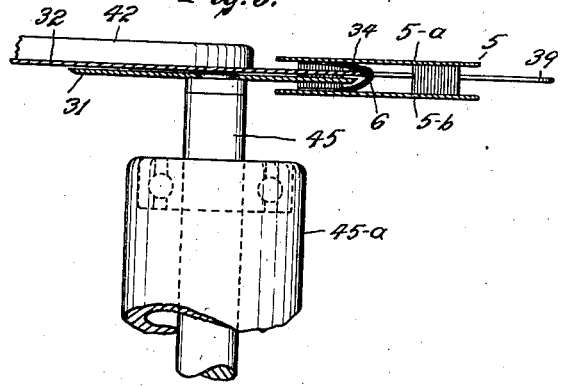
Fig. 6 is an enlarged fragmentary view on line 6—6 of Fig. 4.

During the movement of the tape through the machine, the cross threads 7, being geared to the disks 32 by means of the notches 33, will rotate the said disks in the direction indicated by the arrows thereon and the said notches will permit the cross threads to come into contact with the cutters 31 and be severed thereby as they move past the same, as indicated clearly in Fig. 4.

When one group of cross threads is nearly severed as illustrated in Fig. 4, the following extension 39 on the disk 31 will have entered between the straps 5—a and 5—b and will be disposed directly in front of the following group of cross threads so that, as soon as the first group of cross threads is completely severed and the rotation of the disk 32 is momentarily retarded by the brake disk 43, the following group of cross threads will engage the next extension 39 and thereby continue rotation of the disk 32.

Figure 3:
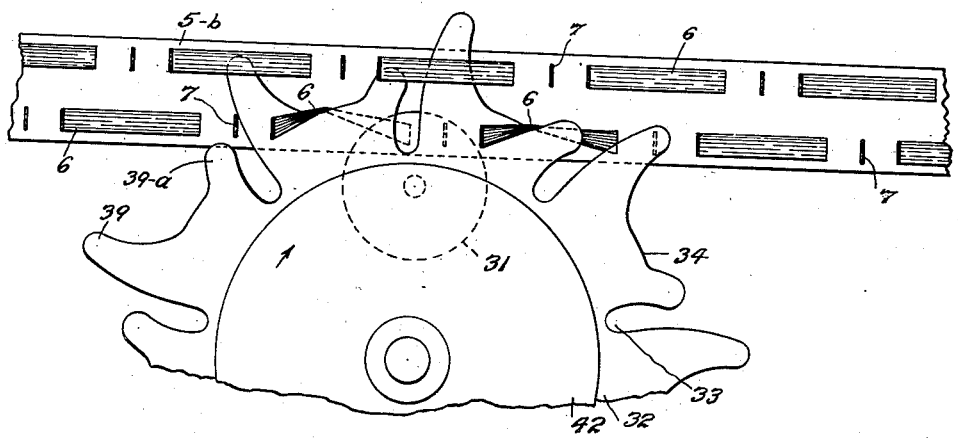
Fig. 3 is an enlarged plan view, showing a portion of a Venetian blind tape in section and illustrating one position of the cutting mechanism during the operation thereof.

As the said disk is rotated, and due to the disposition of the cross straps 6 between the straps 5—a and 5—b, an extension 39—a will move over the leading end of the cross strap following the cross threads which are being cut and the following extension 39 will enter under the said cross strap; thus causing engagement of the intermediate portion of the cross strap with the portion 34 of the disk and thereby moving said cross strap to one side, as clearly illustrated in Fig. 3 of the drawings, so that it will by-pass the cutter 31 without being cut thereby.

From the above description, it will be understood that the operation of my improved machine is such that, during the continuous movement of the Venetian blind tape through said machine, the cross threads of the tape are brought into contact with the cutters to be cut thereby, while the cross straps of the tape are engaged and moved to pass by said cutters without being cut. My machine therefore permits cutting of the cross threads at a high rate of speed which is attainable mainly by reason of the fact that the novel means provided by my invention render possible the use of stationary cutters in combination with a continuously moving tape.

While I have illustrated in detail the operation of the machine at only one side of the tape, it will be clearly understood that the operation of the duplicate disks 32 and cutters 31 is the same and that they will operate at both sides of the tape at the same time.

The operation of the automatic trip mechanism will now be described.

As illustrated in Fig. 10 of the drawings, the contact member 48 is disposed preferably underneath the tape 5 as the same is moved through the machine when it is in its normal position as indicated in dotted lines. Should the proper engagement of the tape with the disks 32 be prevented, by such reason as a miswoven thread or the failure of the cutter to completely cut through a group of cross threads, the said cross threads will be thrown out of mesh with the notches 33, since a cross thread which is not cut will throw the tape out of register with the extensions 39 and prevent said extensions from entering ahead of the following group of cross threads. This will cause the following extension 39 to engage with the following group of cross threads and force the tape outwardly, or in a direction away from the disk 32 to the position shown. When the tape is so forced, it will permit the contact member 48 to move into contact with the post 50 and thereby close an electric circuit which extends from said post through the conductor 51—a, the solenoid 52, the source of energy 57, and the ground connection indicated at 58—58 to the contact member 48.

The closing of said circuit will cause the solenoid to become energized and pull the hook 28 out of engagement with the detent 30 and thereby release the bar 26. This will permit the spring pressed plunger 49 to raise said bar and remove the pressure roll 25 from the tape 5, to release the said tape from its engagement with the feed roll 11 and thereby stop the movement of the tape. The operation of the said trip mechanism will also serve to notify the operator of the machine of a defect in either the tape or the operation of the machine so that the necessary corrections may be made.

It will also be understood that, during the operation of the machine, the tape 5 supports the contact members 49 above the posts 50 and that, when the end of a length of tape has passed through the machine, the said members will drop into contact with the tops of the posts and thereby close the electric circuit and operate the trip mechanism. If desired, a switch may be provided, in the electric circuit, which is operated by the solenoid to also break the circuit to the electric motors 44 and thereby cause the entire machine to come to a complete stop whenever any defect should interfere with the proper operation thereof or when the end of a length of tape passes through it.

My invention also provides for the adjustment of the machine to accommodate different sizes of tape, such as tapes having different distances between cross threads, by simply changing the disks for others corresponding to the particular spacing of the cross threads in the tape to be cut.

Figure 11:
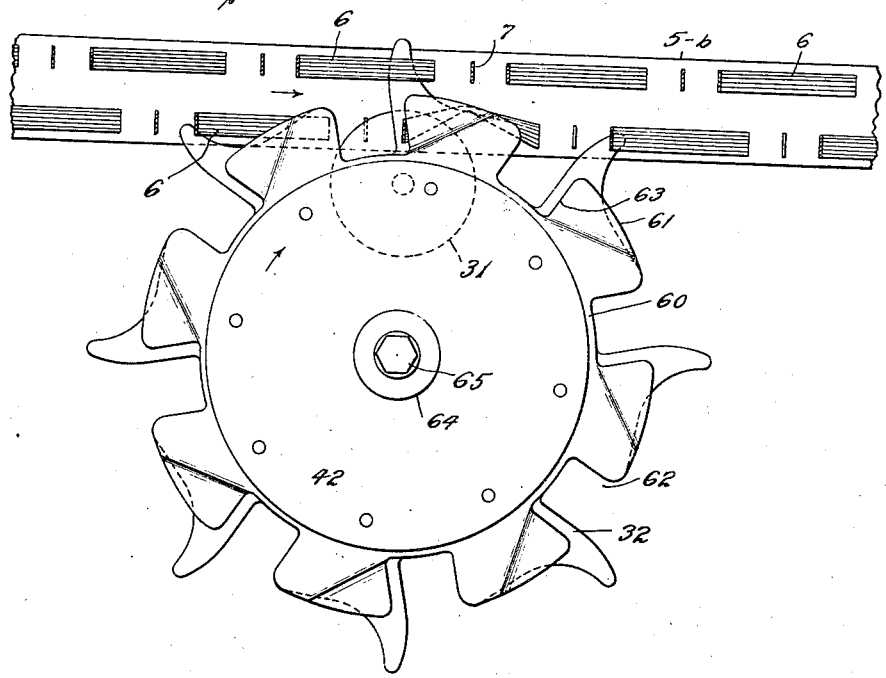
Fig. 11 is a view similar to Fig. 4 but illustrating a modified form of the strap by-passing disk.
Figure 12:
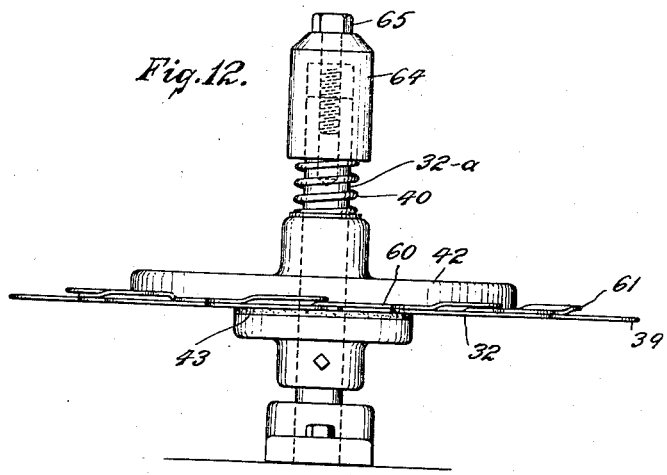
Fig. 12 is a side view of the said disk.

In the modification illustrated in Figs. 11 and 12, the disks 32 are each provided with a superimposed disk 60 having extensions 61 and notches 62. The edges 63 of said notches are spaced slightly above the extensions 39 to engage with the junctions of the cross straps 6 and the upper strap 5—a of the tape 5 and thereby rotate the disk 32.

The said disk 61 therefore provides a means for positively rotating the disk 32 by engagement with the straps 6 and it has been found that this construction will permit a still faster rate of operation of the machine since it eliminates the possibility of interfering with the operation of the disk 32 by the cutting of the cross threads 7. It will be clearly seen, particularly from Fig. 11, that the extensions 39 will operate and cause the cross straps 6 to by-pass the cutters in the same manner as in the form illustrated in Fig. 3 but that the disk 32 is not dependent upon engagement between the cross threads 7 and the said extensions for the rotation thereof.

In Fig. 12, I have also illustrated another form of spring tensioning means which includes a member 64 that fits over the post 32—a and is movable thereon, by means of a screw 65 that is threaded to the top of said post, for adjusting the tension of the spring 49 and thereby providing a closer and more convenient adjustment than can be obtained with the collars 41.

From the above description it will be clearly understood that, by my invention, I have provided a simple and inexpensive machine with a stationary or fixed cutter for cutting the cross threads of Venetian blind tapes while the said tapes are moved through the machine with a continuous movement; thereby permitting rapid movement of the tape, as compared with machines heretofore produced, and simplicity in the construction and operation of said machine.

It is to be understood, however, that while I have shown the use of rotary cutters, the same may also be in the form of fixed cutters without departing from the scope of my invention.

I claim:

1. A cutting machine of the character described, for Venetian blind tape or the like, having alternate cross threads and cross straps, said machine comprising a stationary cutter for cutting said cross threads, and means controlled by the movement of said tape through the machine for preventing said cross straps from engaging said cutter.

2. A cutting machine of the character described including a stationary cutter, means for feeding a tape or web through said machine, and means for moving said tape or web with relation to said cutter to permit the cutting of certain portions and prevent the cutting of other portions of said web.

3. A cutting machine for textile webbing having at least two strips connected by cross threads and cross straps; said machine including a stationary cutter projecting between said strips to intercept and cut said cross threads as the webbing is moved past said cutter, and means controlled by the movement of said webbing for preventing engagement of said cross straps with said cutter.

4. A cutting machine for a textile tape or web having at least two strips connected by cross threads and cross straps; said machine including a stationary cutter projecting between said strips to intercept and cut said cross threads as the tape is moved past said cutter, and means including a member rotated by engagement with said tape for permitting engagement of said cross threads with said cutter and preventing engagement of said cross straps with said cutter.

5. A cutting machine for textile tape or web having at least two strips connected by cross threads and cross straps; said machine including a stationary cutter projecting between said strips to intercept and cut said cross threads as the tape is moved past said cutter, and means including a member in mesh with said tape and actuated thereby to prevent said cross straps from engaging said cutter and permit said cross threads to engage said cutter.

6. A cutting machine for textile tape or web having at least two strips connected by cross threads and cross straps; said machine including a stationary cutter projecting between said strips to intercept and cut said cross threads as the tape is moved past said cutter, and means including a disk-shaped member having portions thereon adapted to engage said cross straps and cause them to by-pass said cutter.

7. A cutting machine for textile tape or web having a least two strips connected by cross threads and cross straps; said machine including stationary cutting means projecting between said straps to intercept and cut said cross threads as the tape is moved past said cutting means, and means including a disk rotatable by engagement with said tape to prevent cutting of said cross straps; said disk having portions adapted to extend between said strips and prevent said cross straps from engaging said cutter.

8. A cutting machine for textile tape or web having at least two strips connected by cross threads and cross straps; said machine including a stationary cutter projecting between said strips to intercept and cut said cross threads as the tape is moved past said cutter, and means for preventing the cutting of said cross straps during their movement past said cutter; said means including a member projecting between said strips and movable by said tape and having notches permitting said cross threads to engage said cutter, and portions between said notches for preventing said cross straps from engaging said cutter.

9. A cutting machine for cutting Venetian blind tape having cross threads and cross straps between adjacent strips, said machine including a stationary cutter projecting between said strips, a disk-shaped member overlying said cutter and also projecting between said strips; said member having notches therein forming extensions therebetween meshing with said cross threads for rotating said disk by the movement of said tape through the machine; said extensions being adapted to engage said cross straps and cause them to by-pass said cutter.

10. A cutting machine for Venetian blind tape comprising at least two adjacent strips of textile material connected by cross threads and cross straps, said machine including a cutter projecting between said strips to intercept and cut said cross threads, and a disk-shaped member having extensions projecting between said cross threads; said extensions being each adapted to overlie one end of said cross straps and underlie the opposite end thereof and thereby engage the cross straps intermediate their ends and move the same to by-pass said cutter.

11. A cutting machine for Venetian blind tape including adjacent strips of textile material connected by cross threads and cross straps, said machine including a cutter projecting between said strips and adapted to cut said cross threads during the continuous movement of said tape past said cutter, and means including a member controlled by engagement with said cross threads and having portions adapted to engage said cross straps during the movement of said tape and move said straps to by-pass said cutter.

12. A machine of the character described for cutting cross threads in Venetian blind tape or the like, including means for moving said tape through said machine under tension, cutter means for cutting the cross threads in said tape, and means for stopping the movement of said tape upon the occurrence of a defect in the operation of said machine.

13. A machine of the character described for cutting cross threads of Venetian blind tape or the like, including said cross threads, means for moving said tape past said cutters under tension including a feed roll, a pressure roll for retaining said tape in engagement with said feed roll, and means operatable upon the occurrence of a defect in the normal operation of said machine, or in the construction of said tape, for causing said pressure roll to release said tape and thereby stop the movement of the tape in said machine.

14. A cutting machine of the character described for cutting cross threads in Venetian blind tape or the like, including a cutter for cutting said cross threads, means for feeding said tape past said cutter, electrical means including a solenoid effective upon said feeding means to terminate the movement of said tape in said machine, and means operatable by the tape for controlling said electrical means.

15. In a machine of the character described for cutting cross threads in Venetian blind tape or the like, cutter means for cutting said cross threads, means for moving said tape past said cutter, means for permitting engagement of said cross threads and preventing engagement of said cross straps with said cutter means, and spreader means movable with said tape for spreading the edges of the strips of said tape to receive said cutter and engagement permitting and preventing means therebetween.

16. A cutting machine of the character described for cutting Venetian blind tape or the like including adjacent strips connected by alternate cross threads and cross straps; said machine including a stationary cutter, and means controlled by engagement with said cross straps during the movement of the tape through said machine to permit engagement of said cross threads and prevent engagement of said cross straps with the cutter.

17. A cutting machine of the character described for cutting Venetian blind tape or the like including adjacent strips of textile material connected by cross threads and cross straps; said machine comprising a cutter, and means for permitting the engagement of said cross threads and preventing the engagement of said cross straps with said cutter during the movement of the tape through the machine; said means being movable with said tape by engagement with the cross straps and having portions adapted to cause said cross straps to by-pass said cutter.

18. A machine of the character described for cutting cross threads in Venetian blind tape or the like, including a cutter, means for moving said tape relative to said cutter, a rotatable member controlled by engagement with said tape and having means thereon adapted to move portions of said tape to prevent cutting thereof by said cutter, friction means for applying a drag on said rotatable member to prevent free rotation thereof, and adjustable means for controlling the amount of drag applied to said member.

19. A cutting machine for Venetian blind tape including adjacent strips of textile material connected by cross threads and cross straps, said machine including a cutter adapted to cut said cross threads during movement of the tape in said machine, and means including a member controlled by engagement with said tape for engaging said cross straps and moving them to by-pass said cutter; said latter means including a portion adapted to move under one end of the cross strap and having a projection adapted to move over the opposite end of the cross strap to engage said cross strap with the edge of said portion as it moves past said cutter.

20. A cutting machine for Venetian blind tape including adjacent strips of textile material connected by cross threads and cross straps, said machine having a cutter for cutting said cross threads, and rotatable means movable with said tape and adapted to extend between said strips and engage said cross straps to prevent them from being cut as they move past the cutter.

LOUIS V. LUCIA.